(12) United States Patent
Grossnickle et al.

(10) Patent No.: US 10,813,207 B1
(45) Date of Patent: Oct. 20, 2020

(54) SINGLE-USE PLASMA PINCH NEUTRON GENERATORS

(71) Applicant: THE BOEING COMPANY, Chicago, IL (US)

(72) Inventors: James A. Grossnickle, Bellevue, WA (US); Dejan Nikic, Seattle, WA (US); Mark J. Clemen, Jr., Port Orchard, WA (US)

(73) Assignee: THE BOEING COMPANY, Chicago, IL (US)

( * ) Notice: Subject to any disclaimer, the term of this patent is extended or adjusted under 35 U.S.C. 154(b) by 605 days.

(21) Appl. No.: 15/421,130

(22) Filed: Jan. 31, 2017

(51) Int. Cl.
  *H05H 3/06* (2006.01)
  *H05H 1/06* (2006.01)
  *G21G 4/02* (2006.01)
(52) U.S. Cl.
  CPC .............. *H05H 3/06* (2013.01); *H05H 1/06* (2013.01); *G21G 4/02* (2013.01)
(58) Field of Classification Search
  CPC ... H05H 3/06; H05H 1/06; G21B 1/05; G21G 4/02
  USPC ........................................................ 376/144
  See application file for complete search history.

(56) References Cited

U.S. PATENT DOCUMENTS

| | | | |
|---|---|---|---|
| 2,735,019 A | 2/1956 | Dewan et al. | |
| 3,496,358 A | 2/1970 | Barton | |
| 3,579,028 A | 5/1971 | Cheng | |
| 3,946,240 A | 3/1976 | Roberts et al. | |
| 4,912,731 A | 3/1990 | Nardi | |
| 5,135,704 A | 8/1992 | Shefer et al. | |
| 5,296,712 A | 3/1994 | Swanson | |
| 6,541,786 B1 | 4/2003 | Partlo et al. | |
| 8,212,456 B1* | 7/2012 | Moore | B28B 1/008 310/311 |
| 2009/0065712 A1* | 3/2009 | Zillmer | H05H 3/06 376/116 |
| 2010/0061500 A1 | 3/2010 | Lou et al. | |
| 2010/0215136 A1* | 8/2010 | Rusnak | H05H 3/06 376/108 |
| 2013/0336437 A1* | 12/2013 | Dent | G21G 1/06 376/186 |
| 2017/0018318 A1 | 1/2017 | Radel et al. | |
| 2017/0133114 A1* | 5/2017 | Radel | H05H 3/06 |
| 2018/0220519 A1 | 8/2018 | Grossnickle et al. | |

(Continued)

OTHER PUBLICATIONS

Rovang, "Pulsed-coil magnet systems for applying uniform 10-30 T fields to centimeter-scale targets on Sandia's Z facility", Review of Scientific Instruments 85, No. 12 (2014): 124701. (Year: 2014).*

(Continued)

*Primary Examiner* — Jack W Keith
*Assistant Examiner* — Daniel Wasil
(74) *Attorney, Agent, or Firm* — Moore IP Law (57) ABSTRACT

A single-use neutron generator includes a power supply. The single-use neutron generator includes a fuel source configured to provide neutron-producing fuel. The single-use neutron generator includes a plasma confinement device coupled to the power supply and the fuel source and configured to generate a plasma pinch of the neutron-producing fuel. At least one component of the single-use neutron generator is configured for single use.

20 Claims, 5 Drawing Sheets

(56) References Cited

U.S. PATENT DOCUMENTS

2018/0254593 A1 9/2018 Clemen, Jr. et al.
2019/0277268 A1 9/2019 Nikic et al.

OTHER PUBLICATIONS

Reinovsky, "Pulsed power hydrodynamics: A discipline offering high precision data for motivating and validating physics models", In 2005 IEEE Pulsed Power Conference, pp. 29-36. IEEE, 2005. (Year: 2005).*

Swinth, K. L., et al., "Low-Flux Neutron Imaging," Sep. 1973, Battelle, Pacific Northwest Laboratories, Richland, WA, 10 pgs.

Domanus, J. C., et al., "Practical Neutron Radiography," The Neutron Radiography Working Group, Jan. 1992, Kluwer Academic Publishers, Boston, MA, 289 pgs.

"Measurement of residual stress in materials using neutrons," Jun. 2005, International Atomic Energy Agency, 99 pgs.

Knecht, et al.,"Effects of a Conducting Wall on Z-Pinch Stability", IEEE Transactions on a Plasma Science, vol. 42, No. 6, Jun. 2014, pp. 1531 through 1543.

Golingo, R.P., et al., "Formation of a sheared flow Z pinch," Aerospace and Energetics Research Program, Phys. Plasmas, vol. 12, 2005, American Insitute of Physics, 10 pgs.

Golingo, R., "Formation of a Sheared Flow Z-Pinch," Dissertation submitted for Doctor of Philosophy, University of Washington, 2003, 419 pgs.

Shumlak, U., et al., "The Sheared Flow Stabilized Z-Pinch," Fusion Science and Technology, vol. 61, No. 1T, Jan. 2012, pp. 119-124.

Knecht, Sean D., et al. "Effects of a Conducting Wall on Z-Pinch Stability" IEEE Transactions on Plasma Science, vol. 42, No. 6, Jun. 2014, pp. 1531-1543. (Year: 2014).

Mather, J. W. et al., "Characteristics of the Dense Plasma Focus Discharge" The Physics of Fluids 1968, 11, pp. 611-618. (Year: 1968).

* cited by examiner

SINGLE-USE PLASMA PINCH NEUTRON GENERATORS

FIELD OF THE DISCLOSURE

The present disclosure relates to neutron generators.

BACKGROUND

Z-pinch plasma devices are used to study fusion as an energy source. A z-pinch plasma device that is used as an energy source typically employs aneutronic fusion to generate energy, and aims to produce more energy than the amount of energy the z-pinch plasma device consumes. Aneutronic fusion uses materials selected to produce few neutrons (e.g., as few as possible within operational constraints) since neutrons released from such experiments can be problematic. Z-pinch plasma devices that employ aneutronic fusion do not produce sufficient neutrons for neutron-based applications.

SUMMARY

In a particular implementation, a single-use neutron generator includes a power supply. The single-use neutron generator includes a fuel source configured to provide neutron-producing fuel. The single-use neutron generator includes a plasma confinement device coupled to the power supply and the fuel source and configured to generate a plasma pinch of the neutron-producing fuel. At least one component of the single-use neutron generator is configured for single use.

In a particular implementation, a method of generating neutrons includes providing neutron-producing fuel within an interior of a plasma confinement device of a neutron generator. The method additionally includes applying power to the plasma confinement device to produce neutrons by generating a plasma pinch of the neutron-producing fuel within the plasma confinement device. The power exceeds an operational tolerance of at least one component of the neutron generator.

In a particular implementation, a single-use neutron generator includes an outer electrode and an inner electrode within an interior of the outer electrode. The single-use neutron generator includes a power source electrically coupled to the outer electrode and the inner electrode. The power source is configured to generate a voltage differential between the outer electrode and the inner electrode. The single-use neutron generator includes a fuel source configured to provide neutron-producing fuel. The neutron-producing fuel is configured to undergo ionization to produce a plasma pinch. The plasma pinch is configured to undergo a thermonuclear fusion reaction. At least one component of the single-use neutron generator is configured for single use.

The features, functions, and advantages described herein can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Examples of devices and methods described herein release, produce, radiate, propagate, or generate neutrons using plasma confinement of a neutron-producing fuel (e.g., gas). The neutron-producing fuel is compressed into compact plasma utilizing a self-reinforcing magnetic field referred to as a z-pinch. The plasma undergoes thermonuclear fusion (e.g., neutronic fusion), which releases, produces, radiates, propagates, or generates neutrons.

Figure 1A:
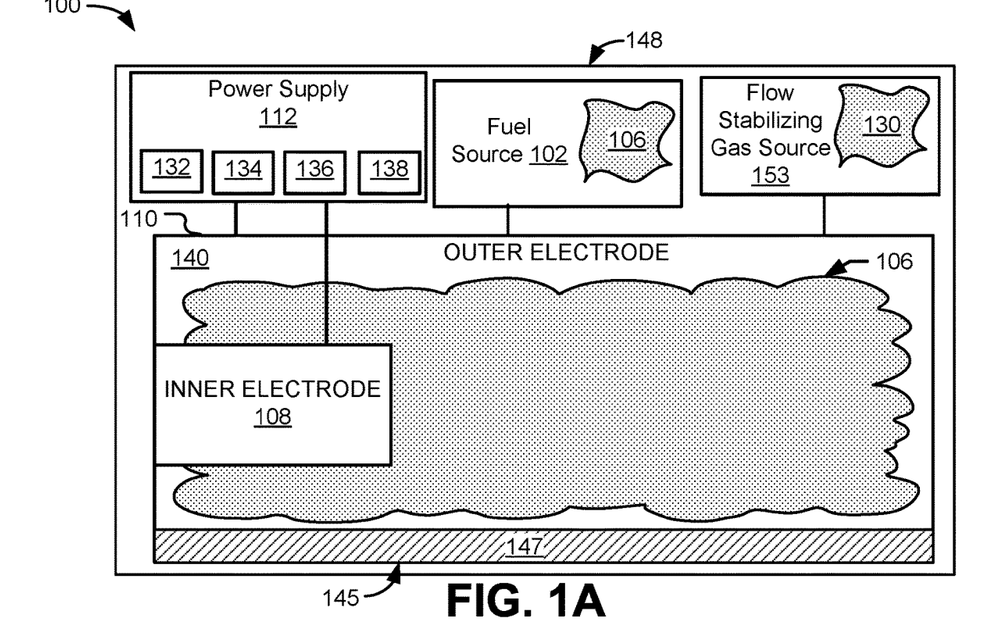
FIG. 1A illustrates a block diagram of an example of a first stage of generating neutrons using a single-use neutron generator configured to generate neutrons using a plasma pinch of a neutron-producing fuel.
Figure 1B:
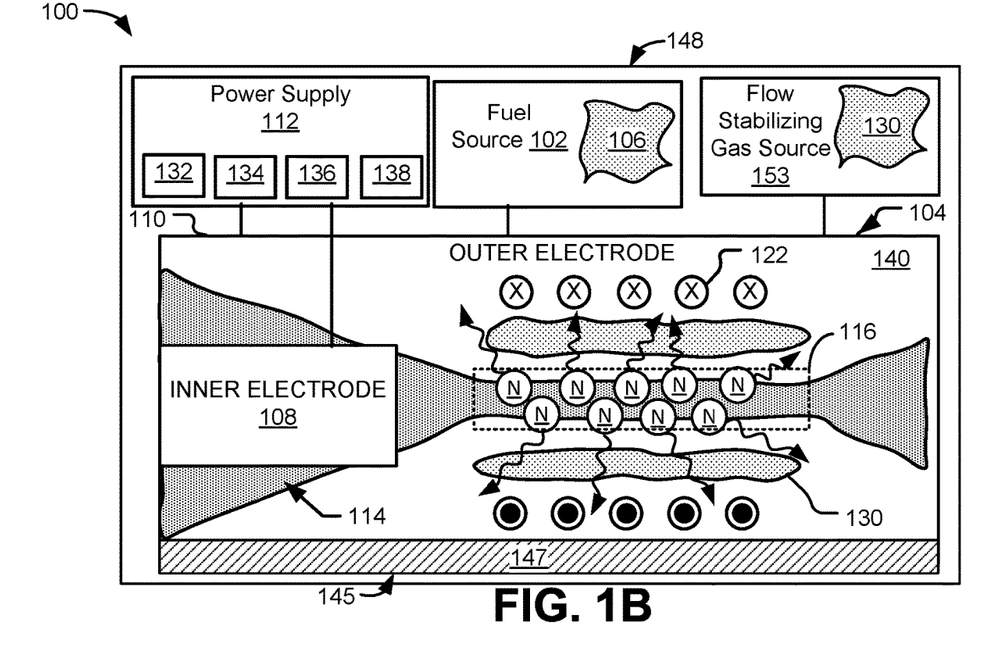
FIG. 1B illustrates a block diagram of an example of a second stage of generating neutrons using the single-use neutron generator of FIG. 1A.

FIGS. 1A and 1B illustrate block diagrams of an example of various stages of a single-use neutron generator 100 during generation of neutrons using a plasma pinch that is generated using a fuel source 102 (e.g., a gas fuel source). The single-use neutron generator 100 includes at least one component that is configured for single use as described in more detail below.

The single-use neutron generator 100 includes a housing 148 to house the fuel source 102, a power supply 112, and a plasma confinement device 104. The fuel source 102, the power supply 112, the plasma confinement device 104, and the housing 148 are configured to be compact so that the single-use neutron generator 100 is a vehicle-deliverable package.

The plasma confinement device 104 is coupled to the fuel source 102. The fuel source 102 is configured to provide or supply a neutron-producing fuel 106 to an interior 140 of the plasma confinement device 104. The neutron-producing fuel 106 is a gas that will experience a neutronic (e.g., as opposed to aneutronic) fusion reaction. In some examples, the neutron-producing fuel 106 includes or corresponds to deuterium, tritium, lithium, or a combination thereof. In some examples, the fuel source 102 corresponds to a neutron-producing fuel 106 stored in a container or other storage apparatus.

The plasma confinement device 104 includes an inner electrode 108 and an outer electrode 110. The inner electrode 108 is located within an interior 140 of the outer electrode 110. In some examples, the inner electrode 108 is a hollow cylinder. Alternatively or additionally, in some examples the outer electrode 110 is a hollow cylinder.

The power supply 112 is coupled to the outer electrode 110 and to the inner electrode 108. In some examples, the power supply 112 is a superconducting magnetic energy storage system 132, a plurality of ultra-capacitors 134, an explosive direct energy converter 136, or a flywheel energy storage device 138. An explosive direct energy converter includes an explosive and is configured to convert kinetic energy (from detonation or explosion of the explosive) into a voltage and/or current. In some examples, the power supply 112 is configured to apply approximately or at least one (1) GigaWatts of power to the plasma confinement device 104 during the single use. In some examples, the power supply 112 is configured to supply at least 500 kilo amps to the plasma confinement device 104 during the single use. In some examples, the power supply 112 is configured to apply power to the plasma confinement device 104 using a pulse having a duration of approximately one second. In other examples, the power supply 112 is configured to apply power to the plasma confinement device 104 using a pulse having a duration of less than one second or more than one second. The amount of power applied, generated, or supplied to the plasma confinement device 104 during the pulse will damage, destroy, or disable (e.g., beyond repair) at least one component of the single-use neutron generator 100 as described in more detail below.

In some examples, prior to the single use, the power supply 112 is coupled to a power charger [not illustrated] to charge the power supply 112. In some examples, the charger is decoupled from the power supply 112 before the single-use neutron generator 100 is deployed for the single use.

During operation, the neutron-producing fuel 106 is provided (e.g., injected or puffed) into the interior 140 of the outer electrode 110. Subsequent to or concurrent with providing the neutron-producing fuel 106 within the outer electrode 110, the power supply 112 is activated, causing the power supply 112 to apply a high voltage differential across the outer electrode 110 and the inner electrode 108. In response to application of the high voltage differential, an electric arc forms between the outer electrode 110 and the inner electrode 108, causing the neutron-producing fuel 106 within the plasma confinement device 104 to ionize into a plasma 114 that is capable of conducting current. Once the neutron-producing fuel 106 ionizes into the plasma 114, continued application of the high voltage differential causes a current to flow through the plasma 114. Current flowing through the plasma 114 creates a magnetic field 122 within the plasma confinement device 104 that squeezes or compresses portions of the plasma 114 to form a plasma pinch 116. The plasma pinch 116 is self-reinforcing, with the current flowing through the plasma 114 creating the magnetic field 122, and the magnetic field 122 in turn further compressing the plasma 114 formed from the neutron-producing fuel 106 in the region of the plasma pinch 116. Thus, the plasma confinement device 104 is configured to generate a plasma pinch 116 of the neutron-producing fuel 106. In some examples, the plasma pinch 116 is at least one half meter (0.5 m) in length.

In some examples, the plasma pinch 116 corresponds to a sheared-flow stabilized z-pinch. A sheared-flow stabilized z-pinch is a z-pinch that is stabilized by a flow (e.g., a continuous flow) of gas (e.g., gas 130) outside (e.g., immediately outside) of the z-pinch 116. In these examples, the single-use neutron generator 100 is configured to inject the gas 130 (e.g., a neutral gas, such as hydrogen) into the interior 140 of the outer electrode 110. In some implementations of these examples, the single-use neutron generator 100 includes a flow-stabilizing gas source 153 to provide the gas 130. In other implementations, the gas 130 may be provided by the fuel source 102 (e.g., the gas 130 may correspond to the neutron-producing fuel 106), in which case the single-use neutron generator 100 does not include the flow stabilizing gas source 153 (e.g., the fuel source 102 serves as a flow stabilizing gas source). Flow of the injected gas 130 proximate to the z-pinch induces a sheared flow of the plasma 114 that stabilizes the z-pinch without using close fitting walls or axial magnetic fields, thereby enabling the z-pinch to remain stable. The flow of the injected gas 130 has a sheared flow velocity profile in the sense that the gas 130 flows at different velocity at the immediate edge of the z-pinch 116 than it does at radial distances farther from the z-pinch 116. In some examples, the z-pinch is stabilized during the duration of the single use (e.g., during the duration of the pulse described above). In some examples, the injected gas 130 fuels the z-pinch. In some implementations in which the injected gas 130 fuels the z-pinch, the gas 130 corresponds to or is formed of the same gas or gases that form the neutron-producing fuel 106.

Application of the high voltage differential once the plasma 114 is formed causes the plasma 114 to experience heating. For example, the plasma pinch 116 progresses through stages in which different heating mechanics dominate. For example, the plasma pinch 116 may experience predominantly Ohmic heating during a first time period, predominantly adiabatic compression heating during a second time period, and predominantly alpha particle heating during a third time period. Particles within the plasma pinch 116 undergo neutronic fusion reactions (e.g., thermonuclear neutronic fusion reactions) when a temperature of the plasma pinch 116 is sufficiently high. In some examples, the neutronic fusion reactions release, produce, radiate, propagate, or generate neutrons N at a rate between $10^{19}$ neutrons per second and $10^{23}$ (or more) neutrons per second.

The single-use neutron generator 100 of FIGS. 1A and 1B additionally includes a neutron modifying medium 145. In some examples, the neutron modifying medium 145 corresponds to a medium that increases a number of the neutrons N released, produced, radiated, propagated, or generated by the single-use neutron generator 100. In some implementations, the neutron modifying medium 145 corresponds to a medium that breeds (e.g., emits or releases) at least one gas of the neutron-producing fuel 106 when the neutron modifying medium 145 is struck by a neutron of the neutrons N. Thus, in these examples, the neutron modifying medium 145 increases the number of the neutrons N released, produced, propagated, or generated by the plasma pinch 116 as compared to the number of the neutrons N released, produced, propagated, or generated by the plasma pinch 116 when the single-use neutron generator 100 does not include the neutron modifying medium 145. As another example, in some implementations, the neutron modifying medium 145 corresponds to a neutron doubler that doubles each neutron of the neutrons N that strikes the neutron modifying medium 145. In these examples, the neutron modifying medium 145 causes the single-use neutron generator 100 to produce, propagate, or generate Y neutrons, where Y is greater than a number of the neutrons N released, produced, propagated, or generated by particles of the plasma pinch 116 that undergo a thermonuclear fusion reaction. In some examples, the neutron modifying medium 145 is formed of or includes lithium. In some examples, the neutron modifying medium 145 is embodied as a liner 147 (e.g., a neutron enhancing liner 147) that is disposed within the outer electrode 110 (e.g., that is disposed on an inner surface of the outer electrode 110), outside of the outer electrode 110 (e.g., on an outer surface of the outer electrode 110 or other surface of the plasma confinement device 104), or both.

In some examples, the number of neutrons released, produced, radiated, propagated, or generated by the single-use neutron generator 100 is sufficient to make the single-use neutron generator 100 suitable to destroy or disable chemical, biological, or radiological weapons.

At least one component (e.g., 108, 110, or 112) of the single-use neutron generator 100 is configured for single use, i.e. the neutron generator 100 is disposable or is self-destructive. In some examples, the at least one component includes the inner electrode 108 or the outer electrode 110. In these examples, the power supply 112 may be configured to apply an amount of power to the inner electrode 108 and to the outer electrode 110 that exceeds an operational tolerance of at least one of the inner electrode 108 or the outer electrode 110. An amount of power applied to the inner electrode 108 and to the outer electrode 110 exceeds an operational tolerance of at least one of the inner electrode 108 or the outer electrode 110 when application of the amount of power for the duration of the pulse is sufficient to damage, destroy, or disable (e.g., beyond repair) at least one of the inner electrode 108 or the outer electrode 110. In this example, the single-use neutron generator 100 is configured for single use because the single use damages (e.g., melts) at least a portion of at least one of the inner electrode 108 or the outer electrode 110. In other examples, the at least one component includes the power supply 112 or power transmission components. In these examples, the single-use neutron generator 100 is configured for single use in the sense that providing the power to the plasma confinement device 104 during the single use will damage, disable, or destroy the power supply 112 or power transmission components [not illustrated]. In some examples, the single-use neutron generator 100 is configured such that the power supply 112 or power transmission components and at least one of the inner electrode 108 and the outer electrode 110 are damaged, destroyed, or disabled based on application of or supplying the power to the plasma confinement device 104. In some implementations, the power supply 112 is configured to apply or supply power to the plasma confinement device 104 using the pulse described above (e.g., a pulse of approximately one second (or more) duration), and application or supply of the power during the pulse is sufficient to melt at least a portion of at least one of the inner electrode 108 or the outer electrode 110, to damage or disable the power supply 112 or power transmission components [not illustrated] of the power supply 112, or a combination thereof.

Figure 2A:
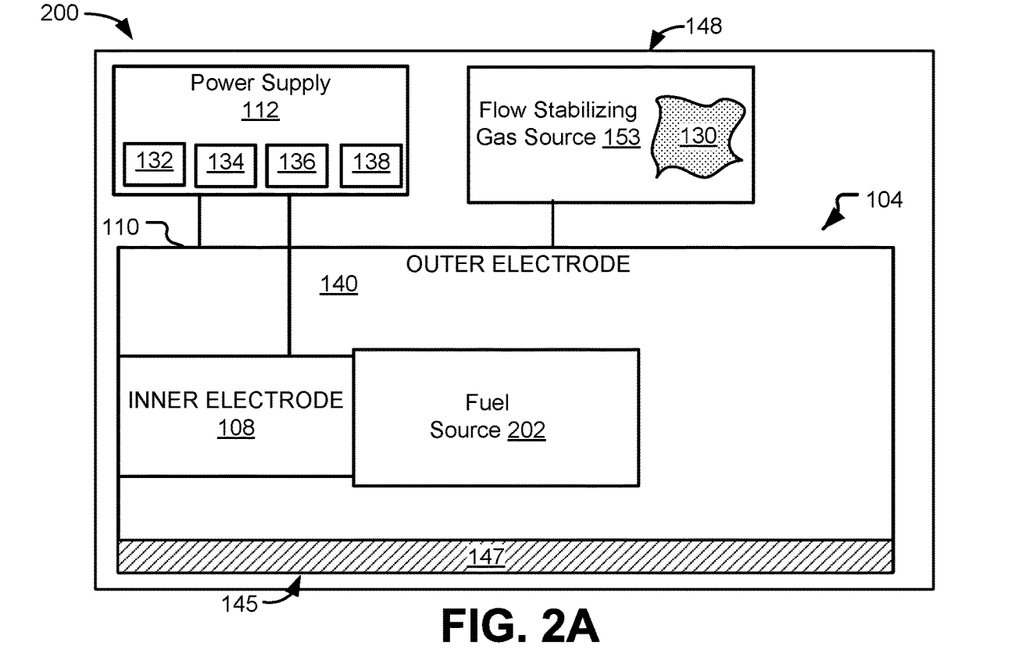
FIG. 2A illustrates a block diagram of an example of a first stage of generating neutrons using a single-use neutron generator configured to generate neutrons using a plasma pinch of a neutron-producing fuel.
Figure 2B:
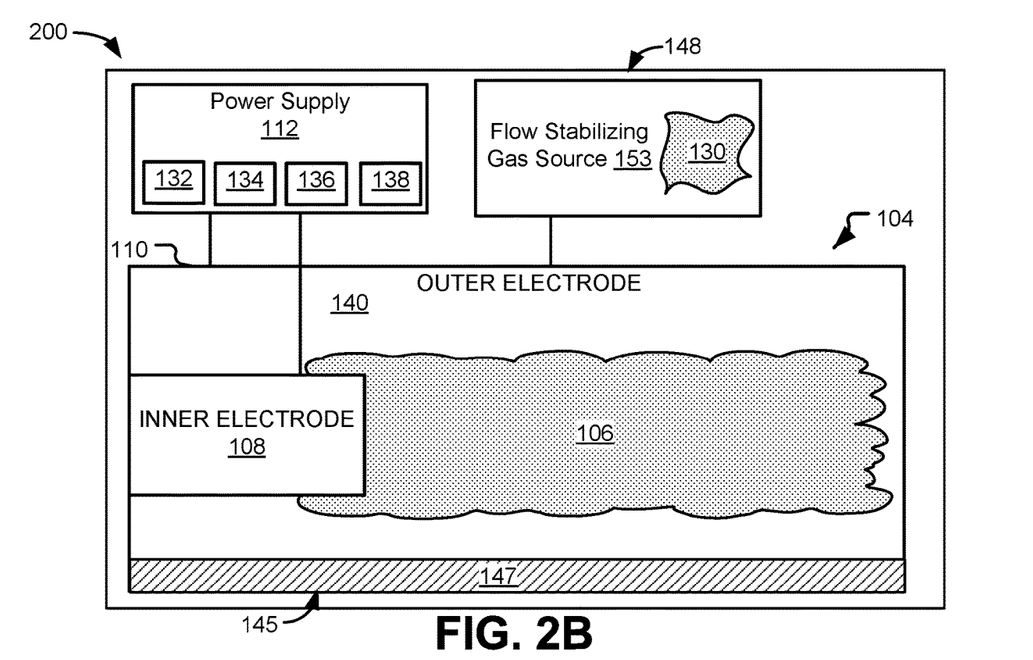
FIG. 2B illustrates a block diagram of an example of a second stage of generating neutrons using the single-use neutron generator of FIG. 2A.
Figure 2C:
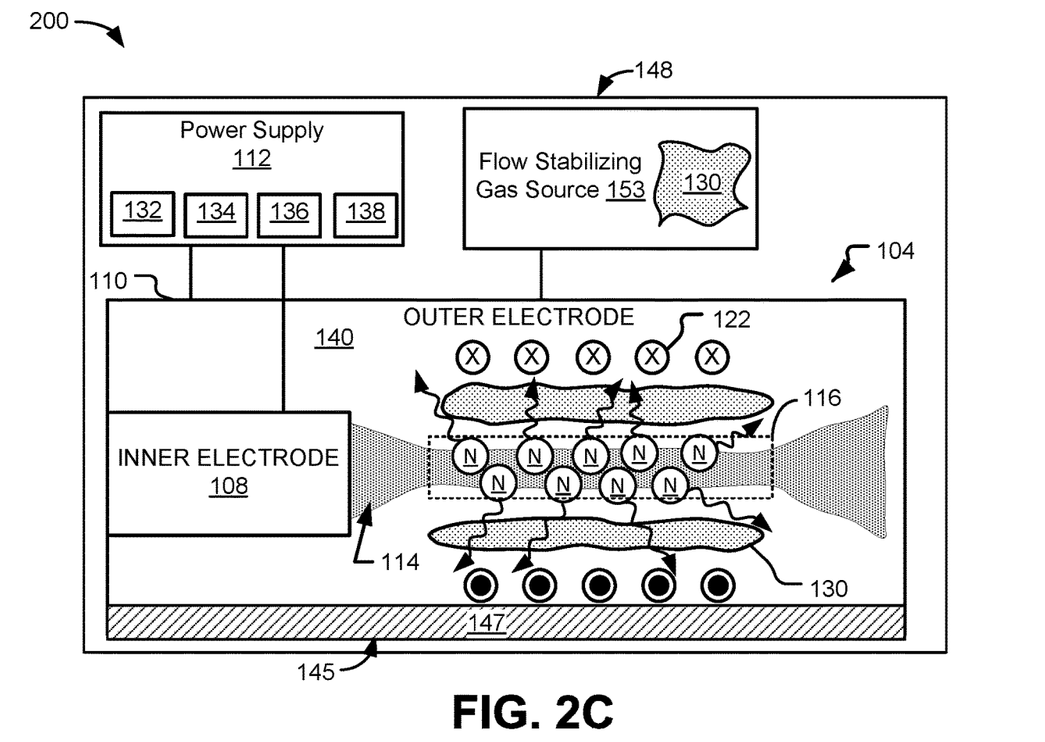
FIG. 2C illustrates a block diagram of an example of a third stage of generating neutrons using the single-use neutron generator of FIG. 2A.

FIGS. 2A-2C illustrate block diagrams of an example of various stages of a single-use neutron generator 200 during generation of neutrons using a plasma pinch that is generated using a fuel source 202 (e.g., a solid fuel source). The single-use neutron generator 200 includes at least one component that is configured for single use as described in more detail below.

The single-use neutron generator 200 includes the housing 148 to house the fuel source 202, the power supply 112, and a plasma confinement device 104. The fuel source 202, the power supply 112, the plasma confinement device 104, and the housing 148 are configured to be compact so that the single-use neutron generator 200 is a vehicle-deliverable package.

The fuel source 202 is disposed within the plasma confinement device 104. The fuel source 202 is configured to provide the neutron-producing fuel 106 responsive to current flow through the fuel source 202 as described in more detail below. In some examples, the fuel source 202 is a wire (e.g., a thin wire). In other examples, the fuel source 202 is an array of wires.

The plasma confinement device 104 includes the inner electrode 108 and the outer electrode 110. The inner electrode 108 is located within the interior 140 of the outer electrode 110. The fuel source 202 is electrically coupled to the inner electrode 108.

The power supply 112 is coupled to the outer electrode 110 and to the inner electrode 108. During operation, the power supply 112 is activated, causing the power supply 112 to apply a high voltage differential across the outer electrode 110 and the inner electrode 108. The high voltage differential results in a current flow along the fuel source 202 (e.g., along the wire or the wire array). The current flow along the fuel source 202 causes at least a portion of the fuel source 202 (e.g., at least a portion of the wire or the wire array) to vaporize into the neutron-producing fuel 106 of FIG. 2B and to ionize into the plasma 114 of FIG. 2C as described above with reference to FIG. 1B. Current flowing through the plasma 114 creates a magnetic field 122 within the plasma confinement device 104 that squeezes or compresses portions of the plasma 114 to form the plasma pinch 116 as described above with reference to FIG. 1B.

In some examples, the plasma pinch 116 corresponds to a sheared-flow stabilized z-pinch as described above. In these examples, the single-use neutron generator 200 includes the flow stabilizing gas source 153 coupled to the plasma confinement device 104. The single-use neutron generator 200 is configured to inject the gas 130 (e.g., a neutral gas) from the flow stabilizing gas source 153 into the interior 140 of the outer electrode 110. Flow of the injected gas 130 proximate to the z-pinch stabilizes the z-pinch without using close fitting walls or axial magnetic fields, thereby enabling the z-pinch to remain stable. In some examples, the z-pinch is stabilized during the duration of the single use (e.g., during the duration of the pulse described above). In some examples, the injected gas 130 fuels the z-pinch. In some implementations in which the injected gas 130 fuels the z-pinch, the gas 130 corresponds to or is formed of the same gas or gases that form the neutron-producing fuel 106.

Application of the high voltage differential after the plasma 114 is formed causes the plasma 114 to experience heating. For example, the plasma pinch 116 progresses through stages in which different heating mechanics dominate and in which neutrons are generated by neutronic fusion (e.g., thermonuclear fusion) as described above with references to FIGS. 1A and 1B. In some examples, the neutronic fusion reactions release, produce, radiate, propagate, or generate neutrons at a rate greater than $10^{19}$ neutrons per second. In some examples, the neutronic fusion reactions release, produce, radiate, propagate, or generate neutrons at a rate greater than $10^{23}$ neutrons per second.

The single-use neutron generator 200 of FIGS. 2A, 2B, and 2C additionally includes the neutron modifying medium 145 described above with reference to FIGS. 1A and 1B. As described above with reference to FIGS. 1A and 1B, the neutron modifying medium 145 interacts with the neutrons N to provide additional fuel to the plasma pinch 116 or to double the neutrons N that are incident on the neutron modifying medium 145.

Figure 3:
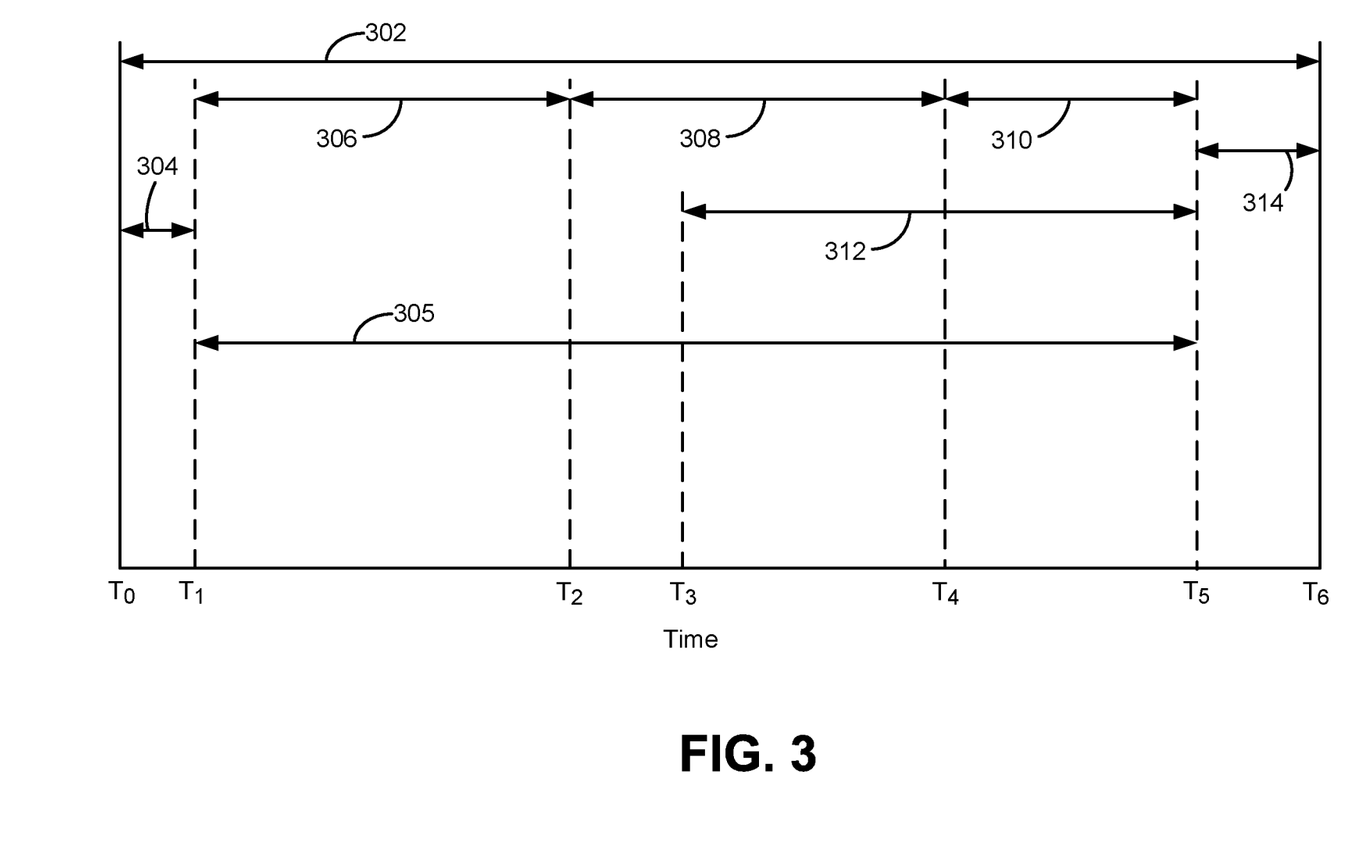
FIG. 3 illustrates a timing diagram illustrating heating mechanics of the plasma pinch of FIGS. 1A and 1B and/or illustrating providing the neutron-producing fuel and heating mechanics of the plasma pinch of FIGS. 2A, 2B, and 2C.

In one aspect, FIG. 3 shows an example of a timing diagram during which the voltage differential described above with reference to FIGS. 1A and 1B is applied to the inner and outer electrodes 108 and 110, respectively, of the plasma confinement device 104 of FIGS. 1A and 1B. In this aspect, the timing diagram of FIG. 3 illustrates a time period beginning subsequent to or concurrent with injection of the neutron-producing fuel 106 into the interior 140 of the outer electrode 110. In the example illustrated in FIG. 3, the voltage differential is applied to the inner electrode 108 and the outer electrode 110 at $T_0$. The voltage remains applied until $T_6$ (represented by time period 302). Additionally the neutron-producing fuel 106 is injected into the outer electrode 110 at or prior to $T_0$ (e.g, prior to a beginning of the time period 302). At time $T_1$, the plasma pinch 116 forms within the outer electrode 110 as described above with reference to FIGS. 1A, 1B, and 1C. The elapsed time between the application of the voltage at $T_0$ and formation of the plasma pinch 116 at $T_1$ is represented by the time period 304 The plasma pinch 116 is maintained until time $T_5$ (e.g., is maintained for a period of time 305). In some examples, the gas 130 is injected into the outer electrode 110 during the time period 305 to achieve shear flow stabilization of the plasma pinch 116. In some examples, the plasma pinch 116 is maintained for greater than one second (e.g., when the pulse described above is longer than one second).

From time $T_1$ to $T_2$, (e.g., during a time period 306 of the pulse described above), the plasma pinch 116 experiences primarily Ohmic heating due to a relatively low temperature (e.g., relatively high resistance). From time $T_2$ to $T_3$, (e.g., during a time period 308 of the pulse described above), heating due to adiabatic compression of the plasma 114 causes the plasma pinch 116 to heat to a greater temperature than would be possible based on Ohmic heating alone. At time $T_3$, the plasma pinch 116 reaches a sufficient temperature to cause particles within the plasma pinch 116 to experience thermonuclear fusion. Thermonuclear fusion of particles within the plasma pinch 116 continues until time $T_5$ (e.g., thermonuclear reaction occurs during the time period 312). Between a time $T_4$ and a time $T_5$ (e.g., during the time period 310), the plasma pinch 116 experiences alpha particle heating and thermonuclear fusion reaction of particles within the plasma pinch 116 continues.

At a beginning $T_5$ of a time period 314, at least one component of the single-use neutron generator 100 experiences sufficient damage that prevents proper operation of the single-use neutron generator 100. Due to the damage, the single-use neutron generator 100 is unable to maintain the plasma pinch 116 and thus produce the neutrons N for the remainder of the pulse (e.g., for the time period 314) and thereafter. At a time $T_6$, the single-use neutron generator 100 is damaged beyond repair.

In another aspect, the timing diagram of FIG. 3 shows an example of a timing diagram during which the voltage differential described above with reference to FIGS. 2A 2B, and 2C is applied to the inner and outer electrodes 108 and 110, respectively, of the plasma confinement device 104 of FIGS. 2A, 2B, and 2C. In this aspect, the timing diagram of FIG. 3 illustrates a time period 302 during which the voltage differential described above with reference to FIGS. 2A, 2B, and 2C is applied. In the example illustrated in FIG. 3, the voltage differential is applied to the inner electrode 108 and the outer electrode 110 at $T_0$. The voltage remains applied until $T_6$ (represented by the time period 302). Between the time $T_0$ and the time $T_1$ (e.g., during the period of time 304), at least a portion of the fuel source 202 (e.g., the wire or the array of wires) vaporizes into the neutron-producing fuel 106. At time $T_1$, the neutron-producing fuel 106 ionizes to form the plasma pinch 116 within the outer electrode 110 as described above with reference to FIGS. 2A, 2B, and 2C. The elapsed time between the application of the voltage at $T_0$ and formation of the plasma pinch at $T_1$ is represented by the period 304. The plasma pinch 116 is maintained until time $T_5$ (e.g., is maintained for a period of time 305). In some examples, the gas 130 is injected into the outer electrode 110 during the time period 305 to achieve shear stabilization of the plasma pinch 116. In some examples, the plasma pinch 116 is maintained for approximately one second.

From time $T_1$ to $T_2$, (e.g., during a time period 306 of the pulse described above), the plasma pinch 116 experiences primarily Ohmic heating due to a relatively low temperature (e.g., relatively high resistance). From time $T_2$ to $T_4$, (e.g., during a time period 308 of the pulse described above), heating due to adiabatic compression of the plasma 114 causes the plasma pinch 116 to heat to a greater temperature than would be possible based on Ohmic heating alone. At time $T_3$, the plasma pinch 116 reaches a sufficient temperature to cause particles within the plasma pinch 116 to experience thermonuclear fusion. Thermonuclear fusion of particles within the plasma pinch 116 continues until time $T_5$ (e.g., thermonuclear reaction occurs during the time period 312). Between a time $T_4$ and a time $T_5$ (e.g., during the time period 310), the plasma pinch 116 experiences alpha particle heating and thermonuclear fusion reaction of particles within the plasma pinch 116 continues.

At a beginning $T_5$ of the time period 314, at least one component of the single-use neutron generator 200 experiences sufficient damage that prevents proper operation of the single-use neutron generator 200. Due to the damage, the single-use neutron generator 200 is unable to maintain the plasma pinch 116 and thus produce the neutrons N for the remainder of the pulse (e.g., for the time period 314) and thereafter. At time $T_6$, the single-use neutron generator 200 is damaged beyond repair.

Figure 4:
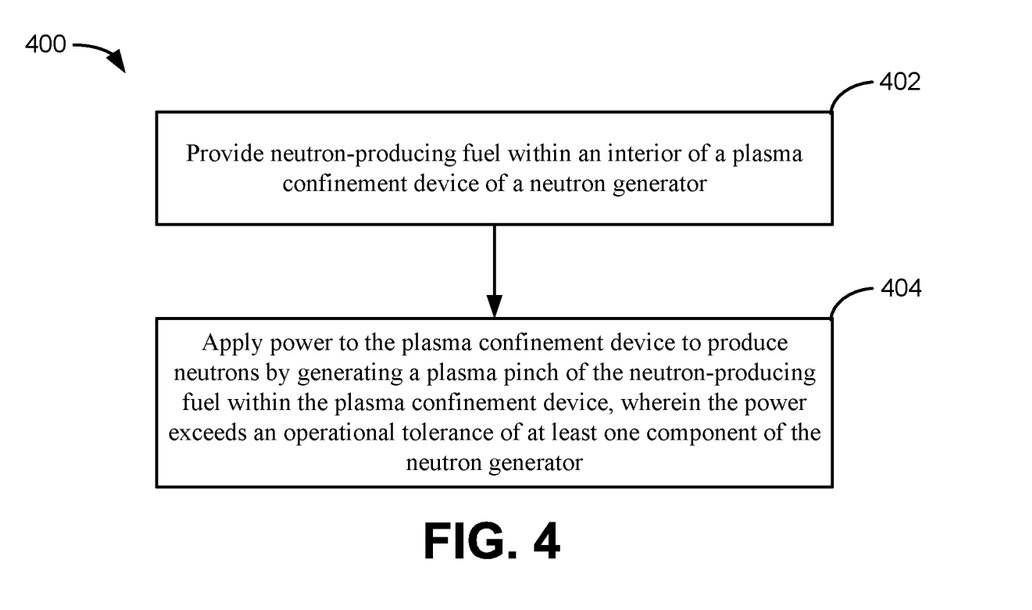
FIG. 4 illustrates a method of generating neutrons using the single-use neutron generator of FIGS. 1A and 1B or the single-use neutron generator of 2A, 2B, and 2C.

FIG. 4 illustrates a method 400 of generating neutrons. In some implementations, the method 400 of FIG. 4 is performed by the single-use neutron generator 100 of FIGS. 1A and 1B or the single-use neutron generator 200 of FIGS. 2A, 2B, and 2C.

The method 400 of FIG. 4 includes, at 402, providing neutron-producing fuel within an interior of a plasma confinement device of a neutron generator (e.g., a single-use neutron generator). The neutron-producing fuel corresponds to the neutron-producing fuel 106 described above with reference to FIGS. 1A, 1B, 2A, 2B, and 2C, and the plasma confinement device corresponds to the plasma confinement device 104 of FIGS. 1A and 1B or to the plasma confinement device 104 of FIGS. 2A, 2B, and 2C. The neutron-producing fuel 106 is provided by a fuel source, such as the fuel source 102 of FIGS. 1A and 1B or the fuel source 202 of FIGS. 2A and 2B.

In some examples, such as when the fuel source corresponds to stored neutron-producing fuel, the neutron-producing fuel is provided within the interior of the plasma confinement device by injecting the neutron-producing fuel into an interior of an outer electrode of the plasma confinement device as described above with reference to FIGS. 1A and 1B. The neutron-producing fuel is injected into the plasma confinement device using or more manifolds, ports and/or valves [not illustrated].

In other examples, such as when the fuel source corresponds to a wire or an array of wires, the neutron-producing fuel is provided within the interior of the plasma confinement device by vaporizing at least a portion of the fuel source. For example, as described above, the fuel source (e.g., the wire or the wire array) is at least partially vaporized responsive to current flow along the fuel source. The current flow is responsive to application of power from a power supply (e.g., the power supply 112 of FIGS. 1A, 1B, and 1C) to the plasma confinement device (e.g., to the inner and outer electrodes 108 and 110 of FIGS. 1A, 1B, and 1C.

Thus, the neutron-producing fuel is provided within the interior of the plasma confinement device by injection of neutron-producing fuel into the interior of the plasma confinement device or by vaporizing a solid fuel source that is located within the plasma confinement device.

The method 400 of FIG. 4 additionally includes, at 404, applying power to the plasma confinement device to produce neutrons by generating a plasma pinch of the neutron-producing fuel within the plasma confinement device. In some examples, the power is applied by the power supply 112 as described above with reference to FIGS. 1A, 1B, 2A, 2B, 2C, and 3. In some examples, the power is applied using a single pulse as described above with reference to FIGS. 1A, 1B, 2A, 2B, 2C, and 3. In some examples, the single pulse is approximately one second.

The plasma pinch corresponds to the plasma pinch described above with reference to FIGS. 1A, 1B, 2A, 2B, and 2C and neutrons are produced by thermonuclear reaction of particles within the plasma pinch as described above with reference to FIGS. 1A, 1B, 2A, 2B, 2C and 3. In some examples, the neutrons are produced at a rate greater than $10^{19}$ neutrons per second. In some examples, the neutronic fusion reactions release, produce, radiate, propagate, or generate neutrons at a rate greater than $10^{23}$ neutrons per second.

The power (applied or supplied to the plasma confinement device) exceeds an operational tolerance of at least one component of the neutron generator. The power exceeds an operational tolerance of the at least one component of the neutron generator when supplying, generation of, or application of the power damages, destroys, or disables the at least one component. In some examples, the power exceeds the operational tolerance of the at least one component when supplying, generation of, or application of the power damages, destroys, or disables the at least one component beyond repair. In some examples, the at least one component includes the power supply 112 or power transmission components, the inner electrode 108 of the plasma confinement device, the outer electrode 110 of the plasma confinement device, or a combination thereof as described above. Because the power applied exceeds the operational tolerance of the at least one component, application of the power will damage, destroy, or disable the at least one component. For example, application of the power from the power supply 112 may melt at least a portion of at least one of the inner electrode 108 or the outer electrode 110. As another example, application of the power to the plasma confinement device 104 may damage or destroy the power supply 112 or power transmission components (e.g., renders the power supply 112 inoperable).

The plasma pinch experiences sufficient heating to cause particles of the plasma pinch to undergo a thermonuclear fusion reaction, thereby releasing, producing, radiating, propagating, or generating neutrons. Thus, at least some neutrons are released by particles of the plasma pinch that undergo thermonuclear fusion. In some examples, the neutrons are released, produced, radiated, propagated, or generated at a rate greater than $10^{19}$ neutrons per second. In some examples, the neutronic fusion reactions release, produce, radiate, propagate, or generate neutrons at a rate greater than $10^{23}$ neutrons per second.

In some examples, the method 400 additionally includes increasing a number of neutrons released by the single-use neutron generator using a neutron enhancing liner 147 disposed within an outer electrode of the plasma confinement device as described above with reference to FIGS. 1A, 1B, 2A, 2B, and 2C.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A single-use neutron generator, comprising:
   a power supply;
   a fuel source configured to provide neutron-producing fuel; and
   a plasma confinement device, the plasma confinement device comprising electrodes coupled to the power supply, wherein activation of the power supply provides a voltage difference to the electrodes of the plasma confinement device configured to ionize at least a portion of the neutron-producing fuel to plasma and generate a plasma pinch of at least a portion of the plasma to generate neutrons, and wherein the activation of the power supply for a single use destroys, or disables beyond repair, at least one of the electrodes of the plasma confinement device.

2. The single-use neutron generator of claim 1, wherein the power supply includes power transmission components, and wherein the activation of the power supply destroys, or disables beyond repair, the power transmission components.

3. The single-use neutron generator of claim 1, wherein the electrodes comprise an inner electrode and an outer electrode, the inner electrode within an interior of the outer electrode, wherein the power supply is electrically coupled to the outer electrode and the inner electrode, and wherein the activation of the power supply is configured to provide the voltage difference between the inner electrode and the outer electrode.

4. The single-use neutron generator of claim 3, wherein the power supply is configured to apply an amount of power to the inner electrode and to the outer electrode that exceeds an operational tolerance of at least one of the inner electrode or the outer electrode.

5. The single-use neutron generator of claim 3, further comprising a neutron enhancing liner within an interior of the outer electrode, outside of the outer electrode, or both.

6. The single-use neutron generator of claim 1, wherein the power supply includes a superconducting magnetic energy storage, a plurality of ultra-capacitors, an explosive direct energy converter, or a flywheel energy storage device.

7. The single-use neutron generator of claim 1, wherein the power supply is configured to apply at least one gigawatt (1 GW) of power to the plasma confinement device during the single use.

8. The single-use neutron generator of claim 1, wherein at least a portion of the neutron-producing fuel in the plasma pinch during the single use undergoes a thermonuclear fusion reaction responsive to heating of the plasma pinch.

9. The single-use neutron generator of claim 1, further comprising a housing, and wherein the plasma confinement device, the fuel source, and the power supply are disposed within the housing.

10. The single-use neutron generator of claim 1, wherein the power supply is configured to supply at least 500 kilo amps.

11. The single-use neutron generator of claim 1, wherein the plasma pinch corresponds to plasma that is formed from the neutron-producing fuel and that is compressed by a magnetic field induced by current flowing through the plasma, and wherein the plasma pinch comprises a sheared-flow stabilized z-pinch.

12. A method of generating neutrons, comprising:
providing neutron-producing fuel within an interior of a plasma confinement device of a neutron generator, the neutron-producing fuel provided from a fuel source of the neutron generator, and the plasma confinement device comprising electrodes coupled to a power supply; and
activating the power supply to apply power to the plasma confinement device to provide a voltage difference to the electrodes configured to ionize at least a portion of the neutron-producing fuel to plasma and generate a plasma pinch of at least a portion of the plasma to generate neutrons, and wherein activation of the power supply for a single use destroys, or disables beyond repair, at least one of the electrodes of the plasma confinement device.

13. The method of claim 12, wherein the electrodes comprise an outer electrode and an inner electrode, and wherein applying the power melts at least a portion of at least one of the outer electrode and the inner electrode.

14. The method of claim 12, wherein activating the power supply for the single use renders the power supply inoperable.

15. The method of claim 12, wherein at least some of the neutrons are produced by thermonuclear fusion reaction of particles of the plasma pinch.

16. The method of claim 12, wherein the neutron-producing fuel includes deuterium, tritium, lithium, or a combination thereof.

17. The method of claim 12, further comprising increasing a number of neutrons released during the single use by using a neutron enhancing liner disposed within an outer electrode of the plasma confinement device.

18. The method of claim 12, wherein the neutrons are produced at a rate greater than $10^{19}$ neutrons per second.

19. A single-use neutron generator, comprising:
an outer electrode;
an inner electrode within an interior of the outer electrode;
a power supply electrically coupled to the outer electrode and the inner electrode, wherein activation of the power supply generates a voltage difference between the outer electrode and the inner electrode; and
a fuel source configured to provide neutron-producing fuel between the outer electrode and the inner electrode, wherein during use after activation of the power supply, the voltage difference is configured to ionize at least a portion of the neutron-producing fuel to plasma and generate a plasma pinch of at least a portion of the plasma to generate neutrons via a thermonuclear reaction, and wherein the activation of the power supply for a single use destroys, or disables beyond repair, at least one of the outer electrode or inner electrode.

20. The single-use neutron generator of claim 19, wherein the power supply is configured to apply an amount of power to the inner electrode and to the outer electrode that exceeds an operational tolerance of at least one of the inner electrode, the outer electrode, or the power supply.

* * * * *